US008690600B1

(12) United States Patent
Zeolla (10) Patent No.: US 8,690,600 B1
(45) Date of Patent: Apr. 8, 2014

(54) ELECTRONIC DEVICE SHIELD AND CONNECTOR CASE

(76) Inventor: Giorgio Zeolla, Scarsdale, NY (US)

( * ) Notice: Subject to any disclaimer, the term of this patent is extended or adjusted under 35 U.S.C. 154(b) by 311 days.

(21) Appl. No.: 13/316,478

(22) Filed: Dec. 10, 2011

(51) Int. Cl.
*H01R 13/72* (2006.01)
*H01R 13/44* (2006.01)

(52) U.S. Cl.
USPC ........... 439/501; 439/502; 439/638; 439/136; 439/131

(58) Field of Classification Search
USPC .......... 206/320; 430/638, 501, 502, 131, 136, 430/367
See application file for complete search history.

(56) References Cited

U.S. PATENT DOCUMENTS

| | | | |
|---|---|---|---|
| 6,046,571 A * | 4/2000 | Bovio et al. ............... | 361/679.58 |
| 6,519,144 B1 * | 2/2003 | Henrie et al. ............ | 361/679.43 |
| 6,544,075 B1 * | 4/2003 | Liao ............................... | 439/638 |
| 6,646,866 B2 * | 11/2003 | Kao ........................... | 361/679.26 |
| 6,722,917 B2 * | 4/2004 | Huang ............................ | 439/501 |
| 6,733,328 B2 * | 5/2004 | Lin et al. ....................... | 439/501 |
| 7,066,753 B1 * | 6/2006 | Tseng ............................ | 439/259 |
| 7,088,578 B1 * | 8/2006 | Gruby et al. ............. | 361/679.56 |
| 7,104,816 B1 * | 9/2006 | Wang ............................ | 439/136 |
| 7,811,101 B2 * | 10/2010 | Tang et al. .................... | 439/131 |
| 7,845,967 B1 * | 12/2010 | Shu et al. ...................... | 439/367 |
| 8,075,318 B2 * | 12/2011 | Zhao et al. ...................... | 439/13 |
| 8,206,163 B2 * | 6/2012 | Zhao et al. .................... | 439/131 |
| 8,453,835 B2 * | 6/2013 | So ................................... | 206/320 |
| 2003/0223185 A1 * | 12/2003 | Doczy et al. .................. | 361/680 |
| 2008/0026614 A1 * | 1/2008 | Emerson et al. ............. | 439/136 |
| 2008/0153350 A1 * | 6/2008 | Dei Rossi et al. ............ | 439/607 |
| 2008/0276099 A1 * | 11/2008 | Nguyen et al. ................ | 713/186 |
| 2009/0196587 A1 * | 8/2009 | Cheung .......................... | 392/394 |
| 2010/0281209 A1 * | 11/2010 | Ni et al. ......................... | 711/103 |
| 2011/0269335 A1 * | 11/2011 | Zhang et al. .................. | 439/502 |
| 2012/0008268 A1 * | 1/2012 | Jiang et al. ................. | 361/679.4 |
| 2012/0108087 A1 * | 5/2012 | Ding ............................. | 439/131 |

* cited by examiner

*Primary Examiner* — Briggitte R Hammond
(74) *Attorney, Agent, or Firm* — Luis Figarella (57) ABSTRACT

An electronic device protective case with a built-in capability to have a connector or cable that enables it to interface to power and communication sources without the need for a separate cable. The connector can be an AC connector for power, or a DC connector for power and/or signals, such as an universal serial bus (USB) connector or similar connector. The connector or cable can the move between a stowed position within the protective case housing and a deployed positions where it is external to said case.

20 Claims, 9 Drawing Sheets

ELECTRONIC DEVICE SHIELD AND CONNECTOR CASE

PATENTS CITED

The following documents and references are incorporated by reference in their entirety, Morrison (U.S. Pat. No. 7,151,912), Bi (U.S. Pat. Appl. No. 2009/0128090), Bean et al (U.S. Pat. Appl. No. 2004/0036449), Groves et al (U.S. Pat. No. 6,402,546), Godovich (U.S. Pat. Appl. No. 2006/0267547), Jones, III et al (U.S. Pat. No. 6,379,178), Simon et al (U.S. Pat. Appl. No. 2009/0051312), Skowronski (U.S. Pat. No. 6,702,077) and Fan (U.S. Pat. No. 5,592,066).

FIELD OF THE INVENTION

The present invention relates to a shielding case for portable electronics devices, in particular to ones that house various connectors and cables in order to connect or power the device without the use of a separate cable.

DESCRIPTION OF THE RELATED ART

Most of us have a portable electronic device with wireless capabilities. These range from cellular Handsets and Smartphones (such as the iPhone, Android or other devices), Tablets (such as the iPad), eReaders (e.g. Nook, Kindle, Fire), Music players (iPod, Nano, etc.), game controller (such as Nintendo DS, Sony PSP and others), to laptop computers. Most of these devices perform all data communications via wireless protocols (e.g. Wi-Fi, Bluetooth, Cellular protocols, 3 G, 4 G, WiMax and others), relegating cable connections to the occasional wired Ethernet and the ever important battery charging.

Charging is typically accomplished via a dedicated Direct Current (DC) connector (typically coming from an Alternate Current to DC (AC/DC) converter, or an Universal Serial Bus (USB) connector, which typically operates at 5V DC. Devices using the USB port for charging include many models of the Blackberry (e.g. Curve), and provide the advantage of allowing one's Smartphone to be charged from one's laptop USB port, obviating the need to carry two chargers when travelling.

What sadly is not obviated, is the requirement to carry a menagerie of cables (whether USB or custom device). Besides their bulk (given the propensity of devices to not require data interfacing via the cable, the extra shielding on these cables mean they are simply overbuilt), these cables constantly require winding and unwinding, which leads to internal conductor failure.

What is needed, is a way to be able to connect your handheld electronic device to a power supply source that does not exceedingly increase the bulk of the device, yet provide a convenient and safe (for the cable or connector integrity) way to store the cable or connector and protect it from damage.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect, the invention comprises an electronic device protective case comprising a shield case designed to snugly fit around an electronic device, said case comprising one or more component cavities, internal electric connection means within said case volume for interfacing with said electronic device, external electric connecting means within said case capable of interfacing with external power sources suitable to powering said electronic device, electronic control circuitry means interfacing to both the internal and external electric connecting means and mechanical means to control the deployment of said external electronic connecting means. In another aspect, said case is pliable. In yet another aspect, said case is made primarily of silicone, or leather, leather imitation products (such as Naugahyde® and others) or Kevlar®.

In another aspect the mechanical means to control the deployment of said external electronic connecting means are comprised of a slidable mechanism. In yet another aspect, said external electric connecting means are comprised of a DC connector, such as an universal serial bus (USB) connector. In one aspect, the mechanical means to control the deployment of said external electronic connecting means are comprised of a swinging mechanism. In another aspect, said external electric connecting means are comprised of a DC connector. In another aspect the mechanical means to control the deployment of said external electronic connecting means are comprised of a spooling cable assembly.

In one aspect, the electronic control circuitry means further comprise a current limiting circuitry. In another aspect, said electronic control circuitry means are controllable via a software application running on said electronic device. In one aspect, said external electric connecting means are comprised of an AC connector and said electronic control circuitry means comprise a transformer rectifier circuitry capable of generating DC voltage.

In one aspect, the invention is an electronic device protective case comprising a flexible shield case designed to snugly fit around an electronic device, said case comprising one or more component cavities, an electronic device interface connector within the internal volume of said case, an external USB connector electrically connected to said electronic device interface connector, said external USB connector being part of a retractable mechanism capable of controlling its extension and retraction into said case cavity. In another aspect, an electronic current control circuit within the case cavity, said current control circuit being capable of limiting the current input to said electronic device.

In one aspect, the invention is an electronic device protective case comprising, a flexible shield case designed to snugly fit around an electronic device, said case comprising one or more component cavities, an electronic device interface connector within the internal volume of said case, a transformer/rectifier circuit within a cavity of said case, said t/r circuit being capable of converting AC voltage to DC voltage, external AC connector electrically connected to said electronic device interface connector, said external AC connector being part of a retractable mechanism capable of controlling its extension and retraction into said case cavity.

Other features and advantages of the present invention will become apparent upon examining the following detailed description of an embodiment thereof, taken in conjunction with the attached drawings.

BRIEF DESCRIPTION OF THE DRAWINGS

6A-6C show various case and connector configurations, according to illustrative embodiments of the invention.

7A-7B show various case and connector configurations, according to illustrative embodiments of the invention.

8A-8B show various case and connector configurations, according to illustrative embodiments of the invention.

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

A fuller understanding of the nature and the objects of the present invention will be more apparent upon consideration of the following detailed description taken in connection with the accompanying drawings.

Referring to FIGS. 1A-1E we show an exemplary embodiment of the invention, a shield case 102 designed to cradle and snugly fit around the three or more sides of a portable electronic device 100 such as a cell phone, Smartphone, Tablet, game controller, or music player. One or more component cavities 104 on the sides or bottom of the case is used to house a variety of electronic components, including electrical (AC and DC) connectors and cables, including extending and retracting means, such as finger or thumb slides, cable winding mechanisms, etc. In the exemplary embodiment shown in FIGS. 1A-1C, the shield case 102 structure extends to one or more of the sides of the electronic device 100 in order to make use of this dimension without making the combination of the electronic device and case exceedingly bulky.

In the embodiment shown, the component cavity is used to house a USB connector 106 that extends in/out of the cavity 104 via a sliding tab 110 within a sliding mechanism 108. In an alternate embodiment, the connector is a Firewire (IEEE-1394) connector, other electrical connectors may be used. While the primary connection desire is one of power, other electrical signals may be carried if desired.

Figure 1:
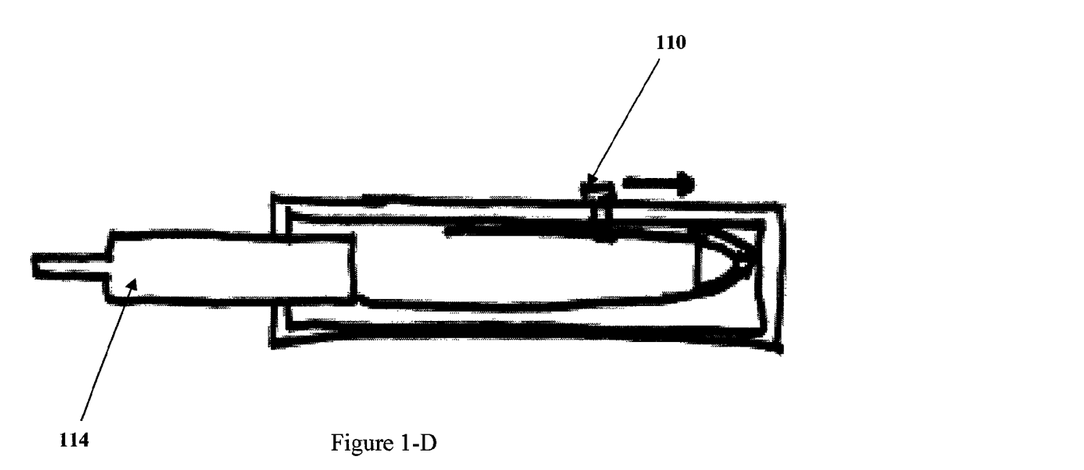
FIGS. 1A-1E show various case and connector configurations, according to an illustrative embodiment of the invention.
Figures 1A, 1B, 1C:
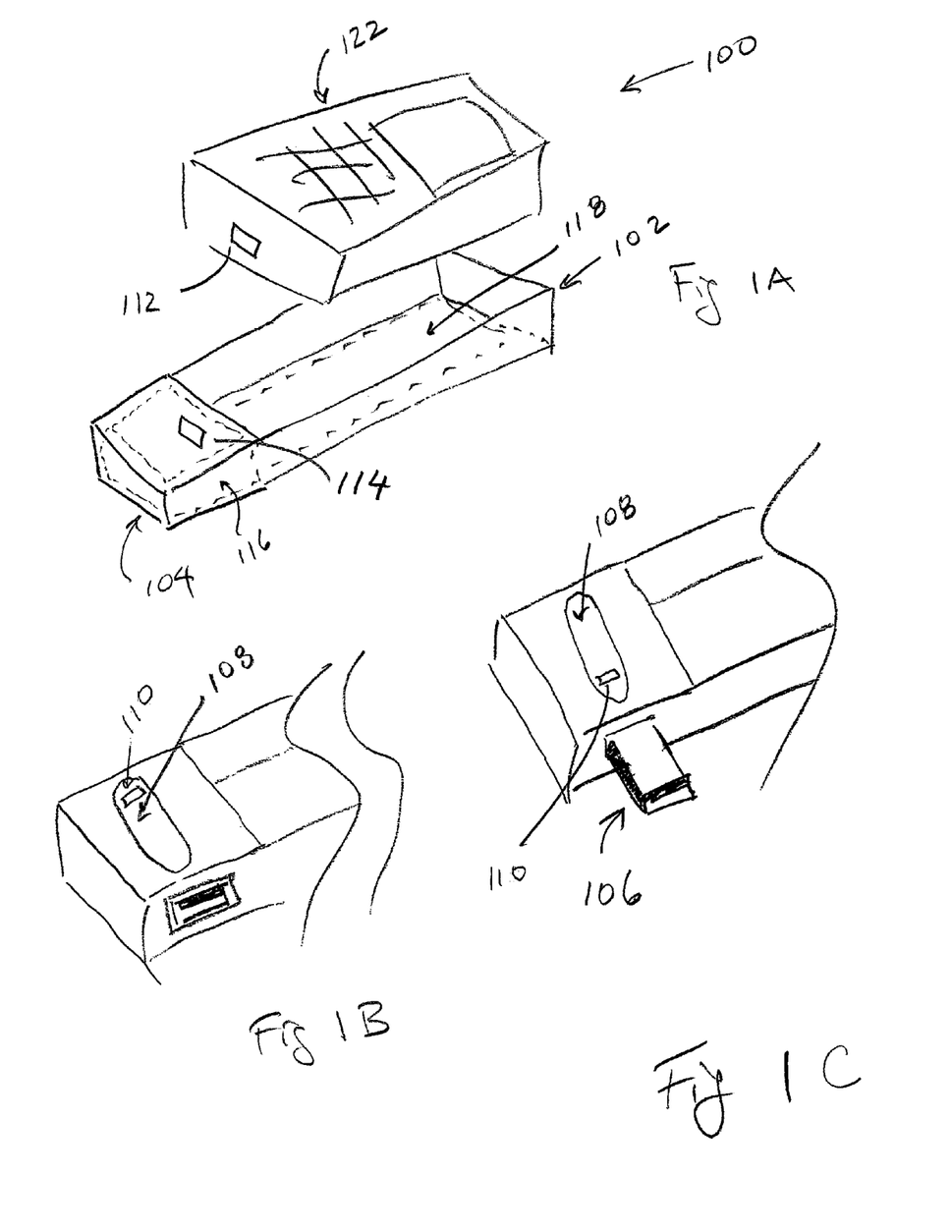

One embodiment for the actual operation of the sliding mechanism is shown in FIG. 1-D. In an alternate embodiment, FIG. 1E the USB connector 106 swivels out. While shown coming from the "bottom" of the case, it could if course also come from the side.

In one embodiment, the unit case 102 is made of a soft pliable material, creating a soft case or mold that in addition to performing the connector carrying function, additionally protects the electronics' device surface from damage. In one embodiment, the case 102 is made of Silicone resin or rubber. Silicones are polymers that include silicon together with carbon, hydrogen, oxygen, and sometimes other chemical elements. Some common forms include silicone oil, silicone grease, silicone rubber, and silicone resin. Such a soft case embodiment would have the advantage of securely attaching to the electronic device. In an alternate embodiment, the case may be constructed of Leather, Teflon, composites such as Kevlar or any other such suitable material In another embodiment, either a semi-soft or even hard case could also be used. The various embodiments of the above units may be constructed of a variety of materials. The case 102 be polymer, plastic or thermoplastic, including such well known materials as nylon, ABS ("acrylonitrile butadiene styrene") or other such moldable plastics. In one embodiment, a composite comprised of an outer silicone shell 102 with an internal housing 116 and/or backing 118 structure may be used to provide a soft feel to the user, while providing suitable structural support for the components.

In order to provide the required interfacing with the electronic device, a suitable connector 114 is situated within the case 102 volume, at a point that allows it to connect electrically with the input socket 112 of the electronic device. Said connection may be magnetic, or it may be by insertion within the electronic's device suitable socket. This connector 114 is electrically connected to the external connection connector 106 in order to transmit the outside power to the electronic device. In an alternate embodiment, such as for a BlackBerry Curve, the connector 114 would be located on left side 122 of the unit, other embodiments may have it located within any of the device's sides. Similarly, the connector 106 may be housed any of the sides or bottom of the case 102.

Figure 2:
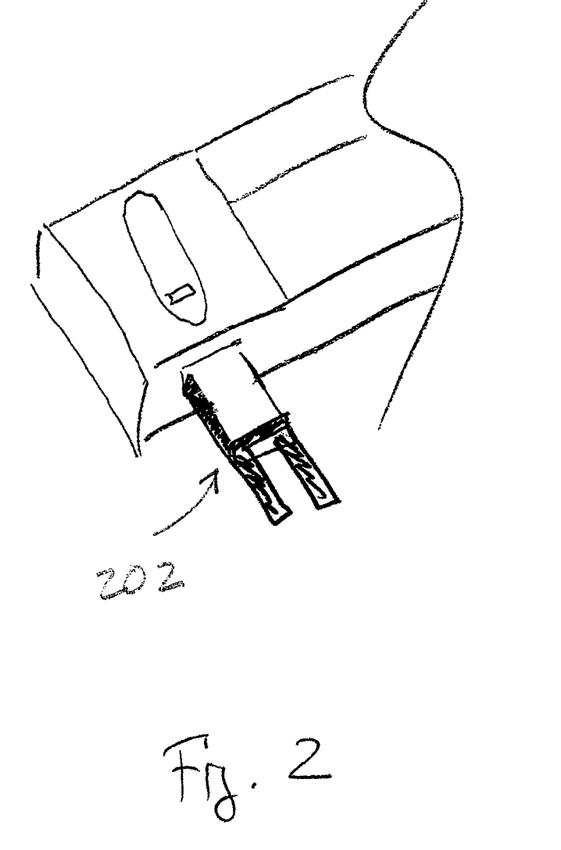
FIG. 2 shows an AC connector configuration, according to an illustrative embodiment of the invention.

Referring to FIGS. 2A-2B, we illustrate an alternate embodiment, where the case 102 is equipped with an AC connector 202. The two most common worldwide voltages are 120 VAC and 220 V AC, with various prongs used in various countries (parallel two bladed in the US, parts of the Caribbean), circular in Europe, tri-flat in England, and others. Of course, the larger challenge here is converting the AC voltage to DC for feeding to the electronic device's battery. In on embodiment, this is done by having the AC/AC transformer and rectifier (to create DC) within the cavity 104.

In one embodiment, the transformer/rectifier circuitry itself is within a plastic enclosure forming the internal housing 116, while in an alternate embodiment the transformer is directly encapsulated in a thermoplastic polyester resin, then inserted within the silicone, with the electrical leads coming to the outside also encapsulated within plastic (thus reducing the risk of high voltage contact to the customer). A suitable material for the above encapsulation would be Rynite® PET, Crastin PBT, Zytel HTN, Zytel PA (all from Dupont) or similar materials from other mfrs. As before, the connector 202 may not be restricted to an in/out configuration, but may also operate in a swivel assembly as shown in FIG. 1E, or even swiveling out from the bottom.

Figures 3A, 3B:
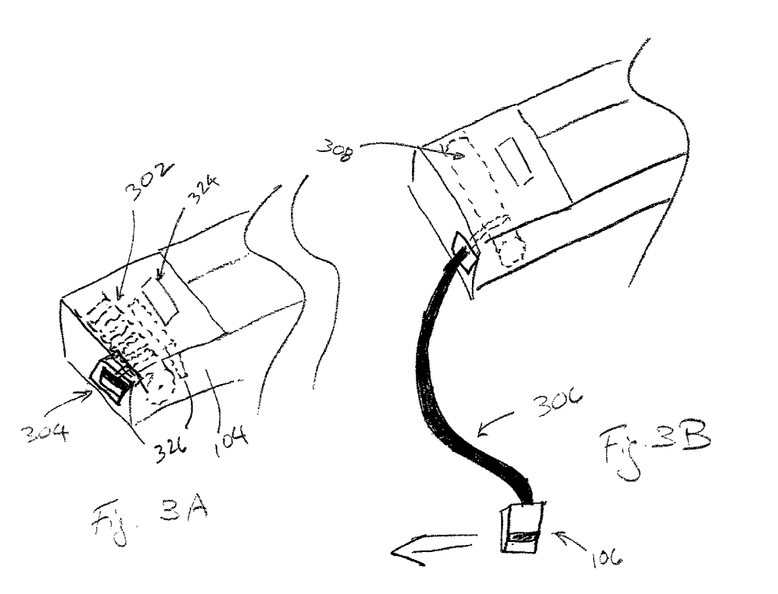
FIGS. 3A-3C show various case and connector configurations, according to an illustrative embodiment of the invention.

Referring to FIG. 3A-3B, we illustrate an exemplary embodiment of a solution using a cable dispenser/retractor system 302 hosting a cable 306 that has an USB connector 106 at one end, with the other end within the cavity 102 or the case 104. Cable retractors are well known in the art (Morrison, Skorowonski), being comprised of a cylinder around which a cable winds, a cable, and some form of spring mechanism with a detent. In one embodiment, the cable is wound around the cylinder 308.

Figure 3C:
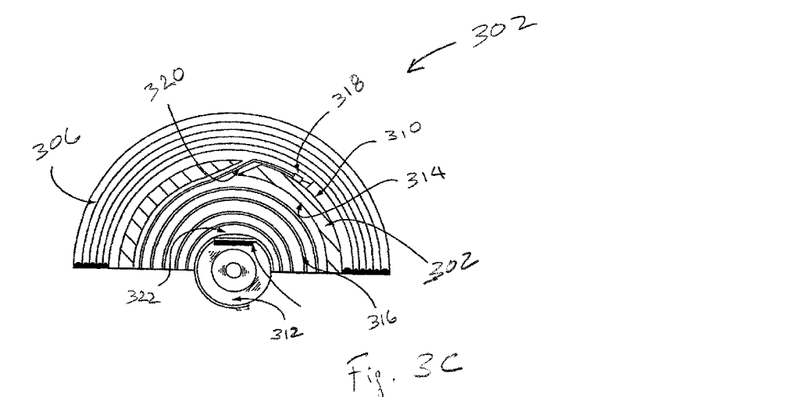

FIG. 3C illustrates a proposed cross section of the cable dispenser/retractor system 302. The reel or cylinder 120 is constructed with a spool wall 310, preferably with a circular in shape, which together with the outer surface of the hub 312 defines a circular cavity 314. A spiral spring 316 is disposed within the cavity 314. An outer end of the spiral spring 316 passes through an opening 320 in the spool wall 310, and connects the retractable cable 112 at electrical connection 318.

In one embodiment, the cable is made to come out by the user pulling the connector 106, and made to retract by the client pushing a For example, the end of the spiral spring connector 246 can be soldered, as shown, to the end of the retractable cable 112. An opposite end of the spiral telephone connector 246 is connected to the housing 102. In one embodiment, a ratchet 322 is placed to prevent the spring force from rewinding the cable 306. The user can reel out an appropriate length of cable and then slowly release the cable to enable the locking mechanism. To recoil the cable, the user tugs on the cable and releases. A spring inside the housing then pulls the cable into the housing. In an alternate embodiment, the ratchet 322 is completely released by the user pressing a rewind button 324.

In an alternate embodiment, a current limiting circuit 326 is added to the case 102 or cavity enclosure 104, or connector 106. Such a circuit would control the maximum current allowed to run through the cable 306. The USB specification allows the current to be within 500 and 900 mA, but the addition of this current limiting circuit would allow for the matching of the cable 306 thickness to match the optimal cable size. In this fashion, the thinnest enclosure (corresponding to the thinnest cable) could be construed (while remaining within the USB specification).

In effect, while this could in some situations delay the charging time for the unit, the advantage would be a thinner/smaller shield case. In an alternate embodiment, the above current limiting circuitry could be controlled by a software application or program (commonly called an app) running within the electronic device's operating system.

Figure 4:
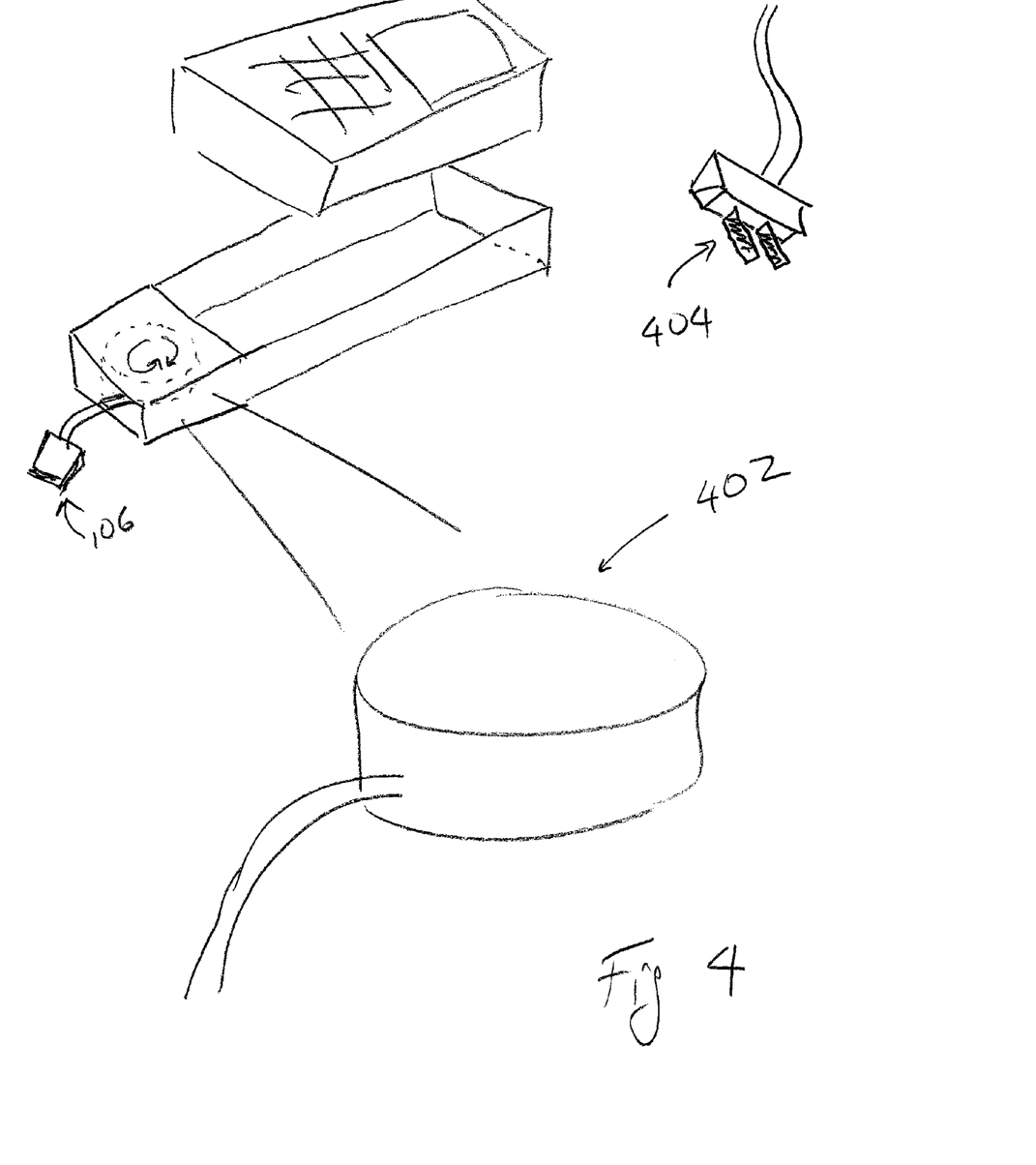
FIG. 4 shows a horizontal spool configuration, according to an illustrative embodiment of the invention.

As before, the cable might be an AC cable (with a corresponding AC plug), and a transformer within the case 102 or cavity 104. In an alternate embodiment FIG. 4, the cable dispenser/retractor 402 is laid horizontally or flat. As before the connector (whether DC 106) or AC 404.

Figure 5A:
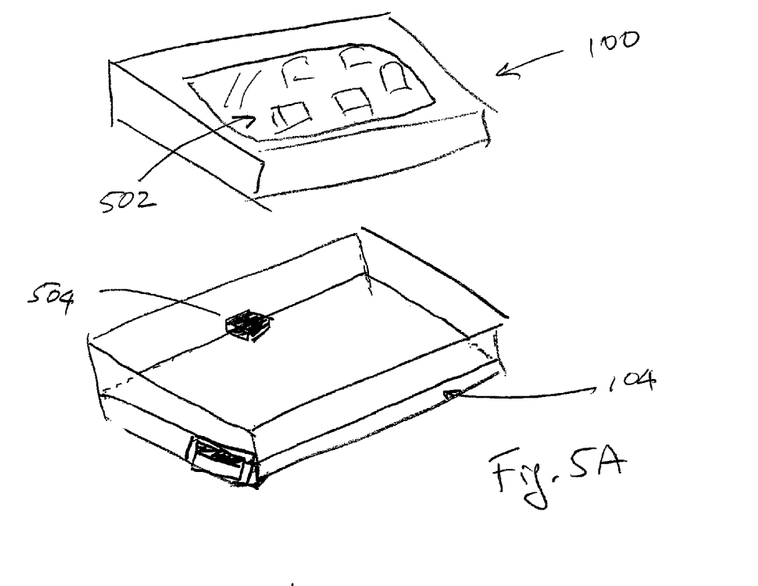
FIGS. 5A-5C show various case and connector configurations, according to illustrative embodiments of the invention.
Figures 5B, 5C:
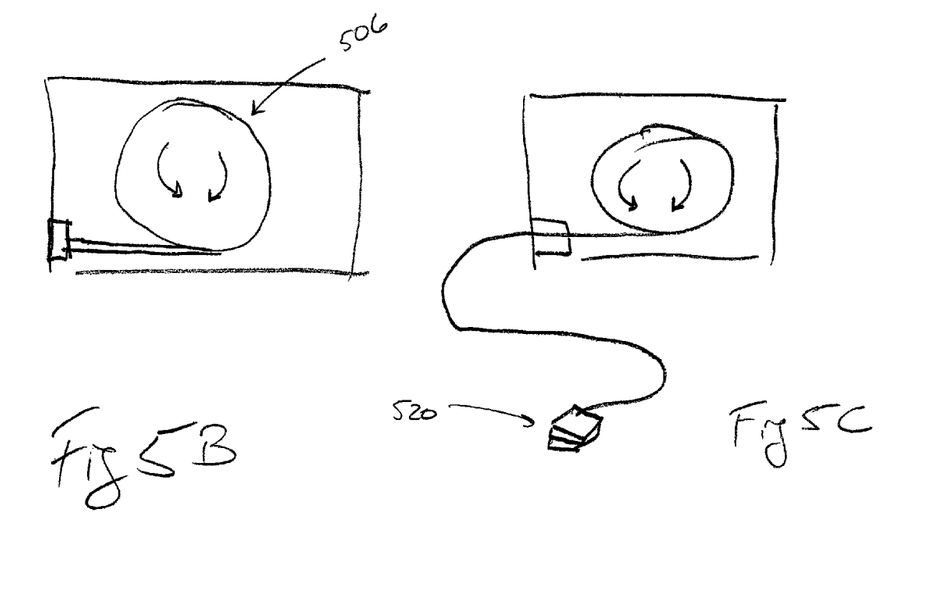

Referring to FIGS. 5A-5C, we show an exemplary embodiment where the connector and/or cable retractor mechanism are both placed in a cavity 104 at the back of the case 102 that is placed snuggly around the electronic device 100 (In this case a unit with a touch screen 502. Again, a connector suitable 504 for mating to the electronic device is placed within the volume of the case 102 at a position suitable to connect. In one embodiment, the cable spool mechanism 506 would take advantage of the larger area to store the cable. Again, the connector 520 may be a DC connector or an AC connector paired with an AC/DC transformer/rectifier as before.

Figure 6A:
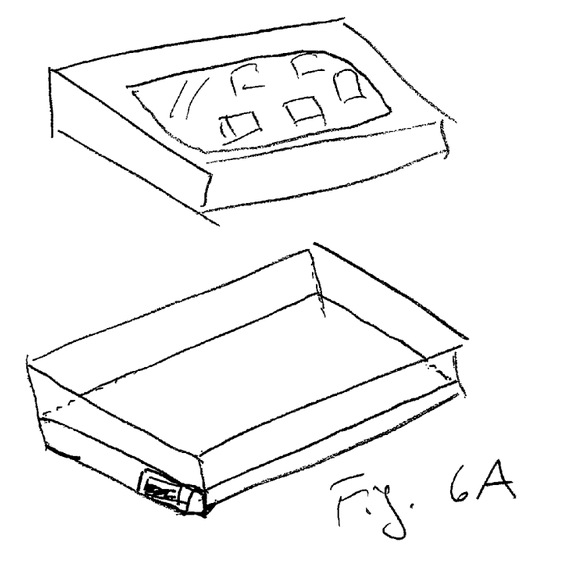
Figure 6B:
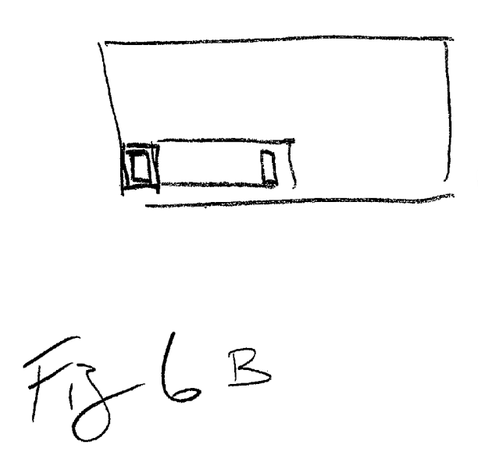
Figure 6C:
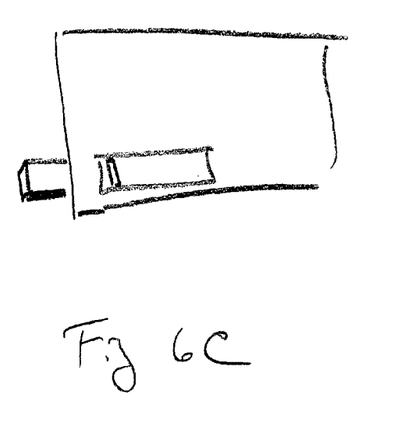
Figure 7A:
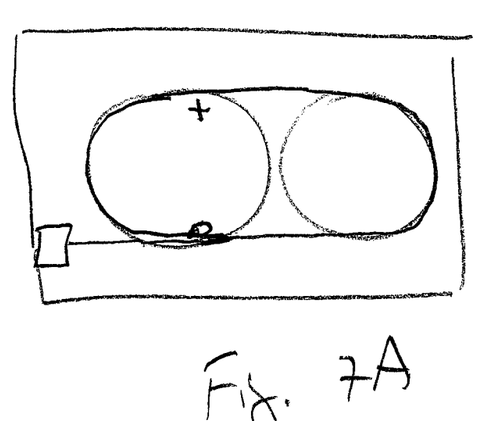
Figure 7B:
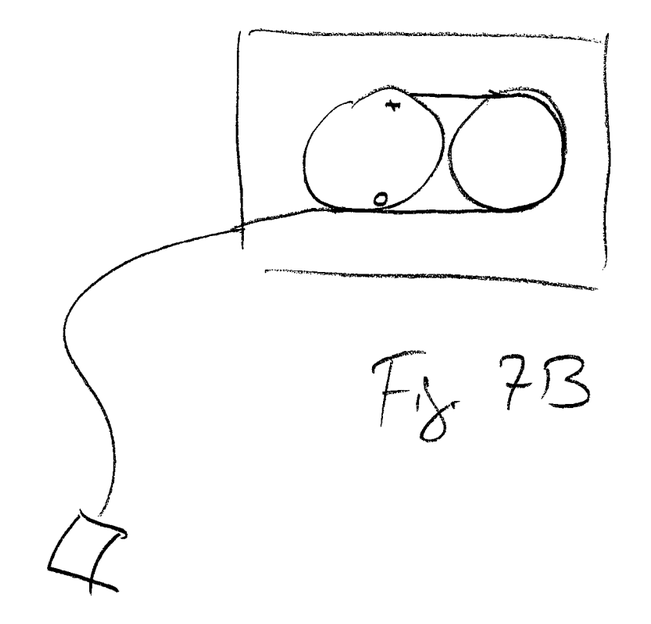

In an alternate embodiment, the cable spool mechanism could be comprised of two or more spools FIGS. 7A-7B, again to use the larger area. In an alternate embodiment, a roll mechanism as shown in 302 could also be used. As seen in FIGS. 6A-6C, a slide DC (or AC) connector could also be used.

It is important to note the importance of an embodiment using a current limiting circuitry. Such a circuit would provide the opportunity to build the unit with a thin or even flat cable gaged for a maximum of 500 mA (or lower with minor software changes to the device, which could be part of an App), instead of one that meets the standard (500 mA to 900 mA), almost half as thick.

Figure 8A:
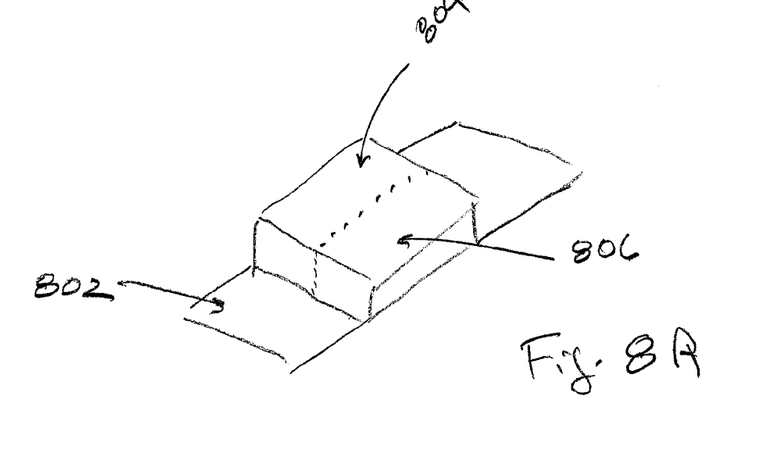
Figure 8B:
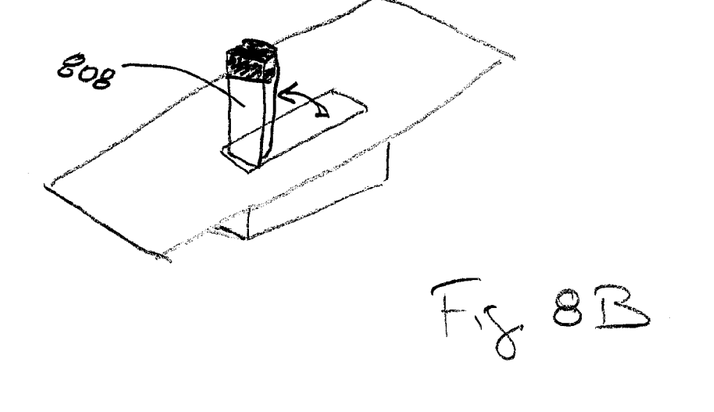

While shown in the bottom and side positions, there is no limitation that would preclude a configuration having components in both the bottom and side of the case 102. In addition, another embodiment would foresee the use of the present volume dedicate to the battery being utilized. As seen in FIGS. 8A-8B, such an embodiment would use the combination of a custom designed back 802 and cavity 804 to use some or all of the space presently dedicated to a battery. In one embodiment, a smaller sized battery could be separate procured, or one 806 could be built into the assembly. The connector 808 would then occupy the other half (or a connector/cable reel system as shown before), either in DC or AC configurations.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. An electronic device protective case comprising;
    a shield case designed to snuggly fit around an electronic device, said case comprising one or more component cavities;
    internal electric connection means within said shield case for interfacing with said electronic device;
    external electric connecting means within said case capable of interfacing with external power sources suitable to powering said electronic device;
    electronic control circuitry means interfacing to both the internal and external electric connecting means; and
    mechanical means to control the deployment of said external electronic connecting means.

2. The electronic device protective case of claim 1 wherein; said case is pliable.

3. The electronic device protective case of claim 2 wherein; said case is made primarily of silicone.

4. The electronic device protective case of claim 2 wherein; said case is made primarily of leather.

5. The electronic device protective case of claim 2 wherein; said case is made primarily of Kevlar®.

6. The electronic device protective case of claim 2 wherein; the mechanical means to control the deployment of said external electronic connecting means are comprised of a slidable mechanism.

7. The electronic device protective case claim 6 wherein; said external, electric connecting means are comprised of a DC connector.

8. The electronic device protective case claim 7 wherein; said external electric connecting means are comprised of USB connector.

9. The electronic device protective case of claim 2 wherein; the mechanical means to control the deployment of said external electronic connecting means are comprised of a swinging mechanism.

10. The electronic device protective case claim 2 wherein; the mechanical means to control the deployment of said external electronic connecting means are comprised of a spooling cable assembly.

11. The electronic device protective case claim 10 wherein; the electronic control circuitry means further comprise a current limiting, circuitry.

12. The electronic device protective case claim 11 wherein; said electronic control circuitry means are controllable via a software application running on said electronic device.

13. The electronic device protective case claim 11 wherein; said external electric connecting means are comprised of a DC connector.

14. The electronic device protective case claim 12 wherein; said external electric connecting means are comprised of a USB connector.

15. The electronic device protective case claim 6 wherein; said external electric connecting means are comprised of an AC connector and; said electronic control circuitry means comprise a transformer rectifier circuitry.

16. The electronic device protective case claim 9 wherein; said external electric connecting means are comprised of an AC connector and; said electronic control circuitry means comprise a transformer rectifier circuitry.

17. The electronic device protective case claim 10 wherein; said external electric connecting means are comprised of an AC connector and; said electronic control circuitry means comprise a transformer rectifier circuitry.

18. An electronic device protective case comprising; a flexible shield case designed to snugly fit around an electronic device, said case comprising one or more component cavities; an electronic device interface connector within said shield case; an external USB connector electrically connected to said electronic device interface connector, said external USB connector being part of a retractable mechanism capable of controlling extension and retraction of said retractable mechanism into said case cavity.

19. The protective case of claim 18 further comprising; an electronic current control circuit within the case cavity, said current control circuit being capable of limiting the current input to said electronic device.

20. An electronic device protective case comprising; a flexible shield case designed to snugly fit around an electronic device, said case comprising one or more component cavities; an electronic device interface connector within said shield case; a transformer/rectifier (t/r) circuit within a cavity of said case, said t/r circuit being capable of converting AC voltage to DC voltage; an external AC connector electrically connected to said electronic device interface connector, said external AC connector being part of a retractable mechanism capable of controlling extension and retraction of said retractable mechanism into said case cavity.

* * * * *